UNITED STATES PATENT OFFICE.

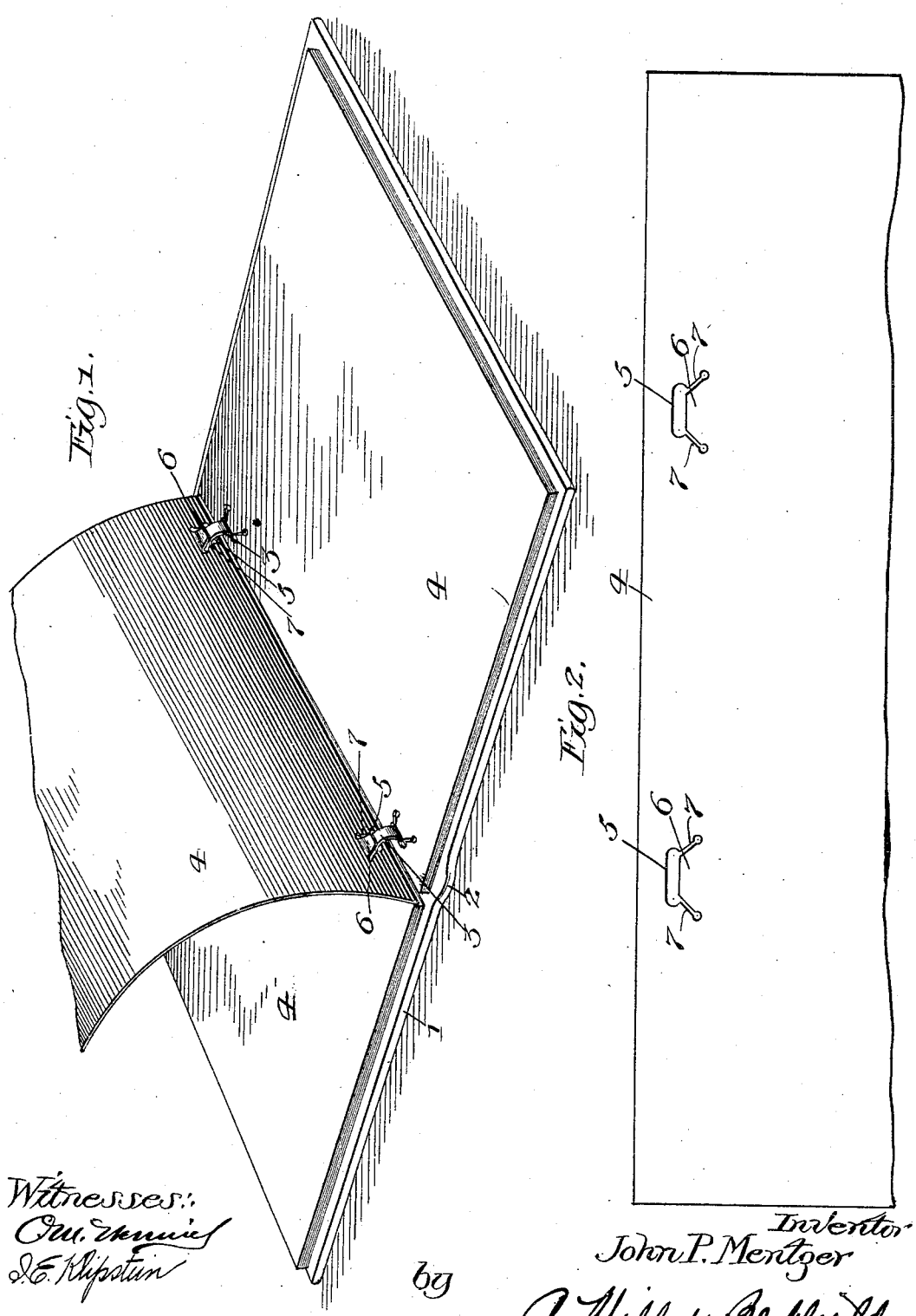

JOHN P. MENTZER, OF CHICAGO, ILLINOIS.

LOOSE-LEAF BINDER.

935,767.

Specification of Letters Patent.

Patented Oct. 5, 1909.

Application filed October 2, 1907. Serial No. 395,513.

*To all whom it may concern:*

Be it known that I, JOHN P. MENTZER, a citizen of the United States, residing at Chicago, in the county of Cook and State of Illinois, have invented a certain new and useful Improvement in Loose-Leaf Binders, of which the following is a full, clear, concise, and exact description, reference being had to the accompanying drawings, forming a part of this specification.

My invention relates to loose leaf binders, and its object is to provide a simple, practical and inexpensive form of binder, and also to arrange for the easy turning of the leaves, and to prevent their being torn while being turned or removed or replaced.

In accordance with my invention I provide a loose leaf binder with flat clasps for holding the leaves temporarily in place, and provide leaves with apertures for the clasps, slightly larger than the clasps themselves and having a tongue cut on one side of the clasp so that in turning the leaves, or in any way moving them relatively to the clasps, the tongue being flexible, yields or gives somewhat, thereby taking up the strain that would otherwise be imposed on the leaf by rubbing against it, and thus preventing tearing of the leaf and also facilitating its movement.

In the accompanying drawings, Figure 1 is a perspective view of a loose leaf binder embodying my present invention; Fig. 2 is a plan view of a portion of one of the leaves or sheets for such binder.

The binder shown in the drawings, comprises a cover 1 with a flexible hinge 2 to which are secured a pair of clasps 3, 3 for holding a series of leaves 4. The clasps 2 can be any suitable form of flat clasp, and as the same form no part of my present invention, they are not described herein in detail. In general they consist of two flat bands hinged at their bases, so that they can swing open to permit the removal and replacement of leaves. The leaves 4, 4 are made with apertures 5 of generally oblong shape and somewhat larger than the bands forming the clasps 3, 3. The leaves are also provided with tongues 6, 6 at the outer side of the apertures 5, 5,—that is to say, at the side toward the outer edge of the binder. These tongues are conveniently of somewhat pointed shape as shown in Fig. 2, made by two diagonal slots or slits 7, 7. Thus when a leaf is turned as shown in Fig. 1, the tongues 6, 6 bend or flex inwardly and thereby take up the strain that would otherwise be imposed upon the loose leaf, and prevent the same tearing and also facilitate its movement.

It will be understood that changes and modifications can be made without departing from the spirit of the invention. For example, the tongues 6, 6 can be made in other ways or of other shapes, but the arrangement shown herein I now prefer as being best qualified to carry out the invention so far as I know.

What I claim as my invention is:—

1. A loose leaf binder having leaf retaining members, and having loose leaves with apertures loosely fitting said members, a slot emanating from each of said apertures providing a flap in said leaves, yielding when said leaves are turned from one side to the other of said binder.

2. A loose leaf binder having leaf retaining members, and having loose leaves with apertures loosely fitting said members, and provided with tongues formed in the leaves adjacent to said apertures for providing a yielding flap when said leaves are turned from one side to the other of said binder.

3. A loose leaf for binders, having closed apertures and also having cuts at the sides of said apertures to form tongues to facilitate turning and replacement of the leaves in the binder from one side thereof to the other.

4. A binder having flat clasps and also having loose leaves provided with oblong apertures larger than said clasps and also provided with tongues formed by diverging slots cut into the outer portion of the leaves at the ends of said slots.

5. A loose leaf for binders, provided with oblong apertures for clasps and also provided with tongues formed by diverging slits extending from substantially the ends of said slots.

6. A loose leaf for binders, having apertures for mounting, and tongues formed by slits in said leaf extending from said apertures provided adjacent to said apertures to present a yielding front when said leaves are turned on their mounting.

7. A loose leaf for binders, having an aperture for mounting and a yielding flap adjacent to said aperture to temporarily increase the size of said aperture when turning said leaf upon a mounting, said yielding flap being on the side of said aperture away from the edge of said leaf.

8. A loose leaf for binders having an aperture and means adjacent thereto upon the side of said aperture away from the edge of said leaf to temporarily increase the size of said aperture when turning said leaf on its mounting to avoid straining the edges of said leaf around said aperture.

9. A loose leaf for binders having an aperture and flexible means adjacent thereto upon the side of said aperture away from the edge of said leaf to temporarily increase the size of said aperture when turning said leaf on its mounting to avoid straining the edges of said leaf around said aperture.

10. A loose leaf for binders having an aperture and means formed from said leaf adjacent thereto upon the side of said aperture away from the edge of said leaf to temporarily increase the size of said aperture when turning said leaf on its mounting to avoid straining the edges of said leaf around said aperture.

In witness whereof, I hereunto subscribe my name this 21st day of June A. D., 1907.

JOHN P. MENTZER.

Witnesses:
L. G. LUMAREE,
ELIZABETH KUHLS.